United States Patent
Kiraly et al.

(10) Patent No.: US 9,959,486 B2
(45) Date of Patent: May 1, 2018

(54) VOXEL-LEVEL MACHINE LEARNING WITH OR WITHOUT CLOUD-BASED SUPPORT IN MEDICAL IMAGING

(71) Applicant: SIEMENS HEALTHCARE GMBH, Erlangen (DE)

(72) Inventors: Atilla Peter Kiraly, Plainsboro, NJ (US); Benjamin L. Odry, West New York, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 231 days.

(21) Appl. No.: 14/518,138

(22) Filed: Oct. 20, 2014

(65) Prior Publication Data

US 2016/0110632 A1  Apr. 21, 2016

(51) Int. Cl.
| | |
|---|---|
| *G06K 9/66* | (2006.01) |
| *G06K 9/34* | (2006.01) |
| *G06K 9/00* | (2006.01) |
| *G06K 9/32* | (2006.01) |
| *G06T 7/11* | (2017.01) |

(52) U.S. Cl.
CPC ........... *G06K 9/66* (2013.01); *G06K 9/00201* (2013.01); *G06K 9/3241* (2013.01); *G06K 9/342* (2013.01); *G06T 7/11* (2017.01); *G06K 2209/05* (2013.01); *G06T 2207/20081* (2013.01); *G06T 2207/30061* (2013.01)

(58) Field of Classification Search
None
See application file for complete search history.

(56) References Cited

U.S. PATENT DOCUMENTS

| | | | | |
|---|---|---|---|---|
| 2015/0150457 | A1* | 6/2015 | Wu ...................... | A61B 5/0073 600/425 |
| 2015/0227809 | A1* | 8/2015 | Alpert .................. | G06K 9/4671 382/132 |

OTHER PUBLICATIONS

Lo, Pechin, et al. "Vessel-guided airway tree segmentation: A voxel classification approach." Medical image analysis 14.4 (2010): 527-538.*
Lo, Pechin, et al. "Extraction of airways from CT (Exact'09)." IEEE Transactions on Medical Imaging 31.11 (2012): 2093-2107.*

(Continued)

*Primary Examiner* — Vu Le
*Assistant Examiner* — Tracy Mangialaschi (57) ABSTRACT

A single level machine-learnt classifier is used in medical imaging. A gross or large structure is located using any approach, including non-ML approaches such as region growing or level-sets. Smaller portions of the structure are located using ML applied to relatively small patches (small relative to the organ or overall structure of interest). The classification of small patches allows for a simple ML approach specific to a single scale or at a voxel/pixel level. The use of small patches may allow for providing classification as a service (e.g., cloud-based classification) since partial image data is to be transmitted. The use of small patches may allow for feedback on classification and updates to the ML. The use of small patches may allow for the creation of a labeled library of classification partially based on ML. Given a near complete labeled library, a simple matching of patches or a lookup can replace ML classification for faster throughput.

19 Claims, 3 Drawing Sheets

(56) References Cited

OTHER PUBLICATIONS

Shin, Hoo-Chang, et al. "Stacked autoencoders for unsupervised feature learning and multiple organ detection in a pilot study using 4D patient data." IEEE transactions on pattern analysis and machine intelligence 35.8 (2013): 1930-1943.*

Kockelkorn T T J P, van Rikxoort E M, Grutters J C and van Ginneken B 2010b Interactive lung segmentation in CT scans with severe abnormalities IEEE Int. Symp. on Biomedical Imaging pp. 564-567.*

Ochs, Robert A., et al. "Automated classification of lung bronchovascular anatomy in CT using AdaBoost." Medical Image Analysis 11.3 (2007): 315-324.*

Zhang, Fan, et al. "Context curves for classification of lung nodule images." Digital Image Computing: Techniques and Applications (DICTA), 2013 International Conference on. IEEE, 2013.*

Kiraly, Atilla P., et al. "Three-dimensional path planning for virtual bronchoscopy." IEEE Transactions on Medical Imaging 23.11 (2004): 1365-1379.*

Kiraly, A. P., et al., "Three-Dimensional Path Planning for Virtual Bronchoscopy," IEEE Transactions on Medical Imaging, vol. 23, No. 9, pp. 1365-1379, 2004.

Van Rikxoort E. M., et al., "Automated segmentation of pulmonary structures in thoracic computed tomography scans: a review," Phys. Med. Biol., 58, pp. R187-R220, 2013.

* cited by examiner

| Gross Segmentation | Machine Learning Small Structure Segmentation | Merging | Updates |
|---|---|---|---|
| Existing methods for segmentation | Focus on identifying small structure via patches in the image Optional cloud-based processing of image patches | Merge results of patches into a single segmented object | User can select any missing locations |

VOXEL-LEVEL MACHINE LEARNING WITH OR WITHOUT CLOUD-BASED SUPPORT IN MEDICAL IMAGING

BACKGROUND

The present embodiments relate to classifying anatomy. In particular, a machine-learnt classifier is used for medical imaging.

A wealth of data is contained in medical images, such as three-dimensional (3D) and four-dimensional (4D) computed tomography (CT) and Dyna-CT volumes of the chest. Manual assessment of such high-resolution datasets is clinically infeasible due to the large content and time constraints on physicians. Therefore, applications involving automatic and semi-automatic processing extract information from the datasets. Such applications include nodule detection, guidance for biopsies, categorization and detection of inflammation, and cancer staging. These applications involve anatomical understanding via segmentation. The segmentation results are the basis for further analysis and results. A robust segmentation with minimal user interaction is useful for further automated analysis.

Segmentation and identification of the airways and other structures of the lungs have been proposed by region growing, morphology, fast marching, and machine learning (ML) approaches. ML approaches use manually defined features. For example, in performing fissure detection, a Hessian operator creates a series of second order derivatives that can be used as features for a ML approach. The ML approach is applied across the entire object of interest. ML is used on derived features across multiple scales. For each scale, the same technique is applied. This multi-scale approach is used in vessel segmentation as well. However, use of multiple scales requires more training data, detailed labeled data, a complex feature set, and/or more processing as compared to ML at one scale.

BRIEF SUMMARY

By way of introduction, the preferred embodiments described below include methods, systems, instructions, and non-transitory computer readable media for use of a single scale machine-learnt classifier in medical imaging. A gross or large structure is located using any approach, including non-ML approaches such as region growing or level-sets. Smaller portions of the structure are located using ML applied to relatively small patches (small relative to the organ or overall structure of interest). The classification of small patches allows for a simple ML approach specific to a single scale or at a voxel/pixel level. The use of small patches may allow for providing classification as a service (e.g., cloud-based classification) since partial image data is to be transmitted. The use of small patches may allow for feedback on classification and updates to the ML. The use of small patches may allow for the creation of a labeled library of classification partially based on ML. Given a near complete labeled library, a simple matching of patches or a lookup can replace ML classification for faster throughput.

In a first aspect, a method is provided for use of voxel-level machine-learnt classifier in medical imaging. A processor segments an anatomical structure of a patient represented in medical imaging data and encapsulates a region that contains the entire structure. The processor divides the anatomy represented in the medical imaging data of the region into a plurality of patches. A machine-learnt classifier classifies each of the patches as including the anatomical structure or not including the anatomical structure. The classifying of each of the patches is independent of classifying the other patches. The processor merges locations for the patches classified as including the anatomical structure to the anatomical structure. A segmented image of the anatomical structure including locations from the locating and the merged locations from the patches is output on a display or as a dataset for further processing.

In a second aspect, a method is provided for use of voxel-level machine-learnt classifier in medical imaging. A structure is located from data representing a patient without using a machine trained operator. A processor classifies, using a machine trained classifier, sub-sets of the data near the structure representing the patient. The structure is expanded with locations corresponding to the sub-sets classified as belonging to the structure.

In a third aspect, a method is provided for use of voxel-level machine-learnt classifier in medical imaging. First labeled patches of scan data of different patients are received from different computers over time. A machine-learnt classifier is trained on the first labeled patches of the scan data of the patients as representing or not an object. Further classifications based on training from the first labeled patches from the classifying are served to the computers. Users of the machine can send second labeled patches and reclassify misclassified first labeled patches. The second labeled patches and reclassified first labeled patches patches and classifications are stored in a database. Once a number of the second labeled patches and the reclassified first labeled patches patches with a statistically significant variation are stored in the database, the classifying with the machine-learnt classifier is ceased and instead the classifying uses a match of new patches with the second labeled and reclassified first labeled patches stored in the database. The classifications for the new patches are served.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 3a illustrates example patches, FIG. 3b illustrates machine learned filters resulting from the patches of FIG. 3a and including non-lung tissue, and FIG. 3b illustrates machine learned filters resulting from the patches of FIG. 3c and only including lung tissue;

DETAILED DESCRIPTION OF THE DRAWINGS AND PRESENTLY PREFERRED EMBODIMENTS

Voxel-level ML (ML) is provided for medical applications. ML methods have the potential to automate and possibly eliminate the need to manually design filters for the identification of objects. However, such methods must often be applied at multiple scales to achieve the desired goal. To avoid the multiple scales, ML is applied to only small scale objects. Existing or other approaches are used to handle larger scales. ML is used only for small patches of the objects of interest, leaving the gross segmentation to already robust methods. The ML problem is reduced to performing classifications of small patches of the image in order to reform an existing segmentation or infer a classification.

The use of small patches allows for classification with cloud computing support with multiple small patches of data. The cloud-based solution may beyond applications of segmentation to assist in computation fluid dynamics and lesion classification. Performing classification in the cloud may result in a revenue-generating cloud-based image processing platform capable of servicing both end users and existing algorithms. The platform may also gather additional data and create a basis for not only evaluating ML approaches but also evolve the service and features. A core image patch library that evolves in terms of data as well as applications may result. A cloud library of image patches that may be utilized by algorithms and the end user is provided.

In the description below, some lung specific examples for bronchial tree segmentation are used with CT datasets. Other organs or anatomic structures may be used. High-resolution CT images of the chest contain detailed information of the lungs and airways. These images are used for lung nodule detection, navigation guidance, and/or diagnosis of a wide range of specific airway diseases. Manual assessment in a clinical setting is limited, making it infeasible to completely harness this information. A radiologist does not have the time to manually process a complete 3D CT dataset given typical expectations. Only through automated approaches can a thorough analysis be performed in a clinical setting.

Automated approaches have been proposed for a wide variety of indications including, for example, nodule detection, guidance for trans-bronchial needle biopsies, and chronic inflammatory diseases such as cystic fibrosis. These methods depend on accurate anatomic segmentations as a basis for more advanced processing. Previous segmentation approaches involve morphology operations, region growing, image filtering, and ML. ML approaches have been applied with manually selected filters and applied on a wide variety of scales. In some embodiments described below, an image segmentation pipeline and service use ML only for small scale structures. Instead of a broad application of ML at multiple scales, a pipe-lined approach focuses ML methods on small components of the images such as the small airways, leaving segmentation of gross structures to existing or other methods. The gross structure is combined with the small structure using hierarchies. By using an existing or other airway segmentation method, a single ML approach only at the voxel level is used. The single scale ML may have a reduced complexity and result in an easier acquisition of a large set of training examples. Deep learning approaches may be applied given the potentially large amount of training examples since manually designing filters to pick out features may be infeasible due to the varying morphology of small airways. A cloud-based implementation and service may leverage a growing database and offer real-time learning of updates from existing users for multiple applications.

The embodiments are not restricted to segmentation processes, but may be applied to other clinical applications. One such application is skin lesion identification. In another application, homogeneity correction is provided in magnetic resonance (MR) images where the label is the homogeneity-corrected patch. Computation flow dynamics (CFD) may use classifications of the patch to produce flow-characteristics. Any other medical application where a labeled-given patch of the image may be used to enhance or drive the application may benefit from the voxel-level ML.

In some example embodiments, a system and a method of segmenting a structure represented in a medical image is provided. An existing segmentation method is used for an initial result. Probable segmented or non-segmented regions are classified based on patches of the same size around the initial segmentation. ML is used to infer the label associated with the given patch. The classification label may include a confidence or probability value for use in deciding the extension of the segmentation. The existing segmentation is extended or shrunk based on the classification of near-by patches. In a cloud-based refinement, patches of image data are accepted, and a label based upon a large database of labeled patches may be returned. The nearest label and patch from the database are returned as the classification.

Figure 1:
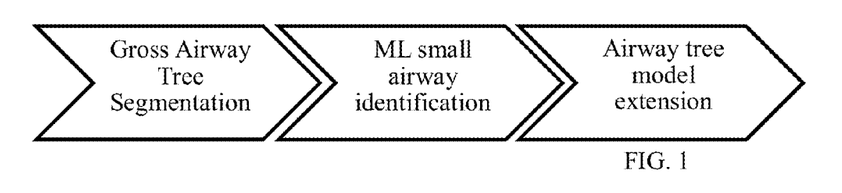
FIG. 1 illustrates one example use of voxel-level ML in airway segmentation.

FIG. 1 shows one embodiment of an approach for airway segmentation. First, the bronchial tree is segmented. The segmentation of this larger structure uses any approach, such as region growing. A model or locations for the structure are acquired by segmenting. Next, patches within the lung are taken and classified according to a machine-learnt classifier. The locations of the patches classified as belonging to the bronchial tree are then merged with the segmented larger structure of the model, extending the segmentation.

Figure 2:
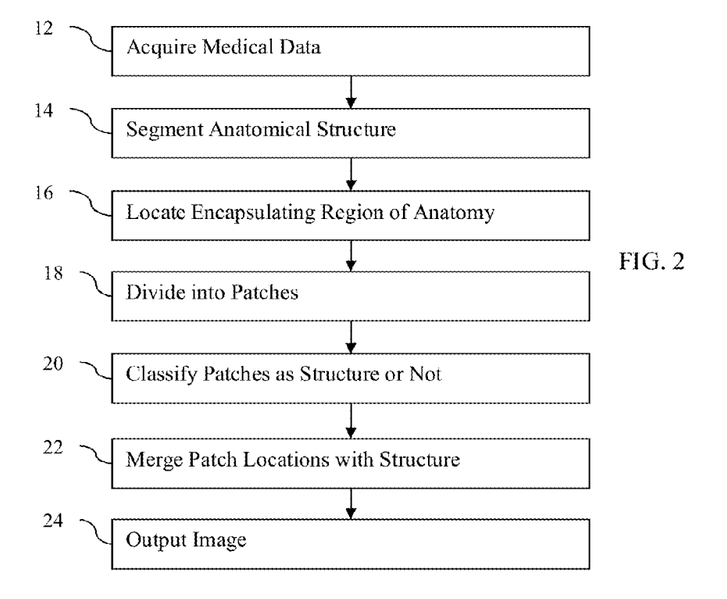
FIG. 2 is a flow chart diagram of one embodiment of a method for use of voxel-level machine-learnt classifier in medical imaging.

FIG. 2 is a flow chart diagram of one embodiment of a method for use of voxel-level machine-learnt classifier in medical imaging. The method is implemented by the system of FIG. 8 or another system. For example, the method is implemented on a computer or processor associated with a magnetic resonance (MR), computed tomography (CT), ultrasound, emission, x-ray or other imaging system. As another example, the method is implemented on a picture archiving and communications system (PACS) workstation or server. In other embodiments, the method is implemented in a computer network, such as the ML classification being performed by a server and other segmenting acts being performed by a local client computer. The acquisition of the medical data is performed by an imaging system or PACS system. The output is on a display or over the network.

The method is for segmenting. An object is located. The segmentation may be locating the object, labeling the object, extracting the object, or separating the object from other objects. The segmentation of the object is of data representing the object. A bronchial tree is segmented in one embodiment. Other anatomical organs or structure may be segmented. Tumors, lesions, or growths may be segmented. In alternative embodiments, inserted or foreign objects, such as a catheter, replacement joint, or stent, are segmented.

The acts are performed in the order shown (e.g., top to bottom) or other orders. For example, act 16 is performed prior to act 14.

Additional, different, or fewer acts may be provided. For example, the method is performed without outputting the image in act 24.

In act 12, a medical image or dataset is acquired. The medical image is a frame of data representing the patient. The data may be in any format. While the terms image and imaging are used, the image or imaging data may be in a format prior to actual display of the image. For example, the medical image may be a plurality of scalar values representing different locations in a Cartesian or polar coordinate format different than a display format. As another example, the medical image may be a plurality red, green, blue (e.g., RGB) values output to a display for generating the image in the display format. The medical image may be currently or previously displayed image in the display or other format. The image or imaging is a dataset that may be used for imaging, such as scan data representing the patient.

Any type of medical image may be used. In one embodiment, the medical image is a chest CT image acquired with a CT system. For example, a chest CT dataset may be used for detecting a bronchial tree, fissures, and/or vessels in the lung. As another example, MR data representing a patient is acquired. Magnetic resonance data is acquired with an MR system. The data is acquired using an imaging sequence for scanning a patient. Data representing an interior region of a patient is acquired. For MR, the magnetic resonance data is k-space data. Fourier analysis is performed to reconstruct the data from the k-space into a three-dimensional object or image space. For CT, the raw data is reconstructed into a three-dimensional representation.

The medical image represents tissue and/or bone structure of the patient. Alternatively, the medical image represents flow, velocity, or fluids within the patient. In other embodiments, the medical image represents both flow and structure.

The medical image represents a one, two, or three-dimensional region of the patient. For example, the medical image represents an area or slice of the patient. Values are provided for each of multiple locations distributed in two or three dimensions. The medical image is acquired as a frame of data. The frame of data represents the scan region at a given time or period. The dataset may represent the area or volume over time, such as providing a 4D representation of the patient.

The medical image or dataset is acquired by an imaging system. Alternatively, the acquisition is from storage or memory, such as acquiring a previously created dataset from a PACS.

In act 14, an anatomical structure is located. The anatomical structure is located by the processor. The identification is of locations of the structure, such as the airway tree.

The segmentation locates a gross or relatively larger part of the anatomical structure (e.g., locates larger airway tree parts). Only part of the anatomical structure is located, such as a gross segmentation. A larger representation of the anatomical structure is found, such as finding the larger branches of the airway tree. The smaller branches, that may be difficult to locate using an approach to find the gross structure, are not located or may be located with less accuracy.

Any now known or later developed approach to locate the anatomical structure may be used. For example, an adaptive region growing and skeletonization approach is used. One or more seeds, such as those in/for the trachea, are located by the processor or manual entry. The seed or seeds are used in region growing to find locations of the bronchial tree. Skeletonization may be used to model the tree structure, such as using lines to represent the centers of the branches of the bronchial tree.

In act 16, an anatomy of the patient is segmented. The anatomy is represented in the medical imaging data. A processor locates the anatomy for segmentation. For example, the processor locates the lungs, a lung, or a portion of the lung. Any anatomy may be located. The locations of the anatomy represented by the data are found, such as identifying the outer boundary and/or volume of the lungs. The locations provide the segmentation encapsulating the anatomic structure. Alternatively, the data and/or locations for the anatomy are separated or isolated form other data as the segmentation.

Any now-known or later developed segmentation may be used. For an example related to lung tissue, the lung is segmented using region growing. The processor identifies part of the lung, such as the trachea. Manual placement of a seed location may be used. From the seed, the region is grown using intensities of the data. Thresholding or other gradient approaches may be used. ML approaches may be used. Combinations of approaches may be used.

In one embodiment, acts 14 and 16 are performed together. Instead of segmenting the anatomic structure in act 14 and then locating the region in act 16 or instead of segmenting the lungs in act 16 and then locating anatomical structure (e.g., airway tree) within the organ in act 14, the airway tree is located and segmented without finding the edges of the lungs.

The segmentation of anatomy in act 16 and/or the locating of the anatomical structure in act 14 are performed without machine-learnt classification in one embodiment. A machine-trained operator (e.g., matrix or other classifier) is not used to locate the anatomical structure at the larger or anatomy scale. Since gross structures may be more easily found using filtering, region growing, thresholding, or other approaches, the complications associated with identifying features, collecting sufficient training data, and testing the machine learned classifier may be avoided. In alternative embodiments, a ML approach is used for the segmenting and/or locating.

Once an initial segmentation and possibly model are obtained, a region about which the segmentation may be further refined is identified. Locations for which smaller parts of the anatomical structure are likely are found. The model may be used to define the locations. Alternatively, the segmentation of the anatomy is used, such as finding locations within the anatomy to cover all or part of the anatomy. For example in the case of the airways, the lung segmentation defines this region. The gross structure of the airways may be used to further limit the region to locations within a threshold distance of the gross structure or to use all lung locations not within the gross structure and not adjacent to one or more parts (e.g., trachea) of the gross structure.

In act 18, the segmented region or part of the segmented region is divided. Alternatively, regions adjacent to the segmented anatomic structure are divided. The processor divides the anatomy represented in the medical imaging data into sub-regions. The sub-regions are patches. The patches are two or three-dimensional spatial parts of the anatomy as represented by the data, so are sub-sets of the medical imaging dataset.

Two or three spatial dimensions define the patches. Patches with additional information, such as one or more measures (e.g., distance from gross structure, velocity of any motion in the patch, and/or elasticity) for each patch may be provided, resulting in additional dimensions of the data (e.g., 7D patches). The patches may be of any dimension. The small patches may be medical image data or other data, such as an extracted surface provided as mesh data representing the one or more surfaces. Filtering may be provided, such as low pass filtering before dividing into patches or separate filtering applied to the patches.

The patches are all the same size, but may be of different sizes. The patches are at a voxel level, such as being relatively small (e.g., less than 5%) as compared to the anatomy or the part of the patient represented by the medical imaging data. In one embodiment, the patches are less than 50 pixels (2D) or voxels (3D or 4D) along a longest dimension, such as being 31 voxels or less along three orthogonal dimensions. The patches have any shape, such as square, cube, rectangular, circular, spherical, or irregular.

The patches are spatially distinct with or without overlap. For example, a one, two, three, or other number of voxel step size between centers of patches is used for a 30×30×30 patch size in overlapping patches. As another example, each voxel is included in only one patch. Different groups of voxels are provided in different patches.

The patches are at a single scale. There is no decimation or creation of patches of different resolution for the same locations. Voxel or pixel-level patches are used. The patches may be filtered or decimated, but are all of the same scale. In alternative embodiments, patches at different scales are provided.

The 2D, 3D, or multi-dimensional patches are processed in a region or around the initial segmentation or set region to help refine or extend the anatomic structure location results. The patches are used to determine whether the anatomical structure extends into the center location of the patch or other part of the area or volume represented by the patch. A patch-based ML approach assists in the refinement of segmentations and may offer added classification data. Since only patches (e.g., relatively small, voxel/pixel-level areas or volumes) are used, generating labeled ground truth for ML training is easier. Based on a pre-determined patch size and a large collection of labeled data values, a sufficient machine-learnt classifier may be more easily developed.

In act 20, each of the patches is classified as including the anatomical structure or not including the anatomical structure. Specific locations within the patch are indicated as being anatomical structure, the whole patch is treated as being anatomical structure, or the center or other location of the patch is used the anatomical structure. The classification assigns a label to each patch as being or including the anatomical structure or not.

In one embodiment, each patch is classified as including airway or not. Due to the patch size and division of the region into patches not including the gross airway structure, each patch is classified as including relatively smaller airways or not. The machine-learnt classifying indicates whether the patches represent a relatively smaller part of the airway tree. In the case of segmentation, the label may define segmentation within the patch (e.g., which locations in the patch are of the anatomical structure or not) or a true or false label indicating that the center of the patch contains the object of interest. In the later return label, overlapping patches are used to examine the entire region of interest.

A processor applies a machine-learnt classifier. The machine-learnt classifier uses training data with ground truth, such as patches known to have or not have anatomical structure, to learn to classify based on an input feature vector. The features of the patches are manually defined, such as using Haar wavelets. Alternatively, the features themselves are learned from the training data. The resulting machine-trained classifier is a matrix for inputs, weighting, and combination to output a classification and/or probability of class membership. Using the matrix or matrices, the processor inputs a patch or features derived from a patch and outputs the classification.

Any ML or training may be used. In one embodiment, a neural network is used. Other deep learnt, sparse auto-encoding classifiers may be trained and applied. The machine training is unsupervised in learning the features to use and how to classify given a feature vector. In alternative embodiments, a Bayes network or support vector machine are trained and applied. Hierarchal or other approaches may be used. Supervised or semi-supervised ML may be used. Any ML method may be used on the small patches of data to accomplish a local segmentation, patch classification, or a local CFD solution.

Multiple ML methods for this approach are possible, so one performing best in a given situation (e.g., mode of input data and/or anatomical structure of interest) may be selected. Regardless of the ML approach, as the sample size of the training increases, the classification results may improve. Given the small patch size, the labeled training samples may be more easily created than if using larger patches.

Figure 3:
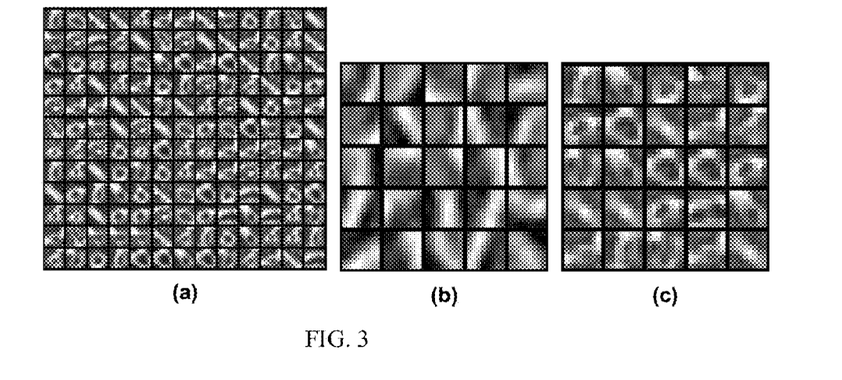

FIG. 3 shows an example of machine-learnt filters using a neural network as an unsupervised learning in deep learning with a sparse auto-encoder. FIG. 3a shows the example input patches of CT data limited to locations in the lung. FIGS. 3b and 3c show a first level of the neural network. This first level is of learnt filters used to create further features for classification. FIG. 3b shows the first level filters when training with the patches of FIG. 3a as well as non-lung tissue patches. The resulting classifier may better distinguish lung or airways from general patch information. FIG. 3c shows the first level filters learned when the training data is limited to the patches inside the lung of FIG. 3a. In this case, the filters have adapted to better highlight airway structures as opposed to other lung structure.

The machine-learnt classifier, applied by the processor to a patch, returns a binary indication of whether the patch includes the anatomical structure. In other embodiments, a probability or confidence in the classification is returned. The classifier outputs an indication of the likelihood that the anatomical structure is in the sub-region represented by the patch.

The classification of each of the patches is independent of the classifying of other patches. For example, a patch being classified as representing the anatomical structure is not used to decide whether an adjacent patch includes anatomical structure. Each patch is individually processed with the results returned and accumulated. Alternatively, dependent classification, such as in an iterative approach, is used.

The machine-learnt classifier may distinguish between more than two types of anatomy. For example, instead of indicating whether the airway tree is or is not represented in the patch, the classifier or a hierarchy of different classifiers determines whether three or more types of anatomy are represented by the patch. The classification may be for more than one type of anatomical structure. The labels may have an abstract meaning, such as malignant lesion, tissue type, flow dynamic, or other. As an example of potential labels in the case of lungs, the patch may have labels and associated segmentations for airway, fissure, vessel, or other. Different labels may be used. Rather than just segmenting and locating airways, arteries and/or veins are segmented and located for extensions to re-connect to a larger proximal vessel segmented as a gross or larger structure.

In one embodiment, the classification is of a skin condition. A lesion or other gross structure is segmented and located. Patches of the gross structure or adjacent locations are classified for type of skin condition. The potential skin condition or conditions are returned by the classification.

In one embodiment, the machine-learnt classifier or classifiers are the only ML or machine-learnt operators or classifiers used in the segmentation or classification. The gross structure locating is performed without machine-learnt classifier or other machine-learnt operator. The scope of the ML is limited to only small structures. Alternatively, ML is used for larger structure identification, segmentation or modeling.

In act 22, the locations indicated as including the anatomical structure are merged together. The processor combines the locations of the anatomical structure determined by classifying the patches with the locations of the anatomical structure determined in act 16. The relatively smaller airways found by classifying patches are merged with the relatively larger airways. This expands the anatomical structure from the gross structure to include locations corresponding to the patches or sub-sets classified as belonging to the structure. In the lung example, the small parts of the airway tree are added to the relatively larger part of the airway tree.

Where overlapping patches are used to indicate whether the center of the patch is of the anatomical structure or not, the locations of the centers of the patches representing anatomical structure are added. Where the classification indicates specific locations in the patches that represent the anatomical structure, those specific locations are added.

In merging, the results of the processed patches are incorporated into the segmentation process or application. In the case of the airway tree, a series of small airway locations, location probabilities, or location confidences are marked. These may be simply appended to the original segmentation. In the case of identifying a skin lesion, the average or sum of results of the patches may be used to determine the difference between benign and malignant cases. For example, each patch returns a probability of benign or malignant. Where a sufficient number of patches indicate one over the other, the lesion is classified. Any statistical-based combination may be used.

In one embodiment, the results of classifying the patches may be used to simultaneously segment more than one anatomical structure. For example, the airways, fissures, and blood vessels within a volume are segmented. Since the label returned may refer to different objects, the same process may be used to segment multiple objects without significantly more computational time.

Due to inaccuracy or other variation, the locations may not be contiguous. Low pass filtering or other image processing may be used to more smoothly connect the anatomical structure locations.

In an alternative approach, the anatomical structure as merged is analyzed by the processor using image processing. Locations may be added or removed from the anatomical structure. For example, locations for patches classified as including the anatomical structure but not connected to other of the locations may be removed. The connection may be direct or through a line or curve fit. For example, the airway may have a stenosis, so a disconnect is possible. The disconnected part is likely to be along a line or curve fit to the other part of the airway. If a straight line or curve with a limited curvature cannot be fit across the gap, then the disconnected locations are removed. Otherwise, a stenosis is indicated. The airway hierarchy is analyzed to eliminate false positives and re-connect airways with stenosis. With other objects such as the liver and prostate, the edges of the image may be corrected using the labeled results.

In one embodiment, the merger using patch classification with gross structure segmentation is used for computation fluid dynamics (CFD). The patch classification is used to quickly compute fluid dynamics for a region as a whole or a specific region. The patches are formed from mesh data instead of image data. The mesh data is a web or other surface in the image data representing the structure. The classification identifies the structure as well as fluid dynamics information. The patch also includes fluid flow input and/or output directions or other information as boundary conditions. The classification label output by the machine-learnt classifier includes computational fluid dynamics solutions. Detailed CFD computations are carried out on the mesh with the results taken as the label. The implementation sends patches of mesh data and initial fluid flow conditions to retrieve the solution as the classification. The machine-trained classifier learned the CFD computation given a mesh.

The solution is propagated to the next "patch" of the mesh as input or output flow conditions. For example in a vessel, the mesh patches represent different locations along the vessel. Solving the CFD problem involves output from the machine-learnt classifier. Given enough data, a nearest neighbor solution may eventually be sufficient, otherwise regression approaches may be used to interpolate the solution. The meshes may also contain different surgical implants that contain pre-computed flow characteristics as well.

In one embodiment, different data sets representing the same patient are used. The different datasets may be the same modality (e.g., CT), but with different settings or image processing, or may be of different modalities (e.g., CT and MRI). The segmenting and classification are performed for each dataset. The confidences or other classification of patches for the same locations but different datasets are combined. Alternatively, the anatomical structure from each dataset is registered to spatially align the datasets. One type of data may be converted into another type of data using the classification or located anatomical structures in the conversion.

After merging, a model of the anatomical structure is provided. The larger and smaller parts of the anatomical structure are joined, providing locations representing the anatomical structure. One or more parts of the anatomical structure may not be included or may be excluded by the user. The locations may be processed, such as skeletonized or a surface mesh created. Alternatively, the locations are low pass filtered or eliminated by other approaches.

In act 24, a segmented image of the anatomical structure is output. The anatomical structure includes locations from locating in act 16 and the merged locations from the patches. In the airway example, the image is of the relatively larger and smaller airways. Other information may be included in the image, such as the anatomy as segmented, patient tissue other than the segmented anatomy, and/or other anatomical structures.

The processor generates the image from the data of the dataset at the locations and/or from the locations on a display or outputs to a memory or over a network to another computer. The image is displayed on a display of a medical imaging system, such as an MR or CT system. Alternatively, the image is displayed on a workstation, computer or other device. The image may be stored in and recalled from a PACS memory.

The image is a function of the locations or segmenting. The image may be the medical image with the anatomical structure overlaid or made more opaque. For example, a color (e.g., blue or red) or graphic is used to highlight the anatomical structure on the medical image. For example, a three-dimensional rendering (e.g., projection or surface) is performed of the anatomical structure (e.g., airway tree) with surrounding tissue (e.g., lungs). In other embodiments, the anatomical structure is rendered alone.

In another embodiment, the image includes text. The text represents a calculated quantity. The segmented anatomical structure is used for calculating the quantity, such as an area, an amount of stenosis, a volume flow, or other quantity. A combination of the medical image with the anatomical structure and text for a quantity may be output as the image.

The output may be provided as part of any application. For example, the output is part of a vessel analysis application. Other applications may be vessel segmentation tools, blood flow tools, or vessel analysis applications. For example, the segmentation is part of an application for analysis of lung operation.

Figure 4:
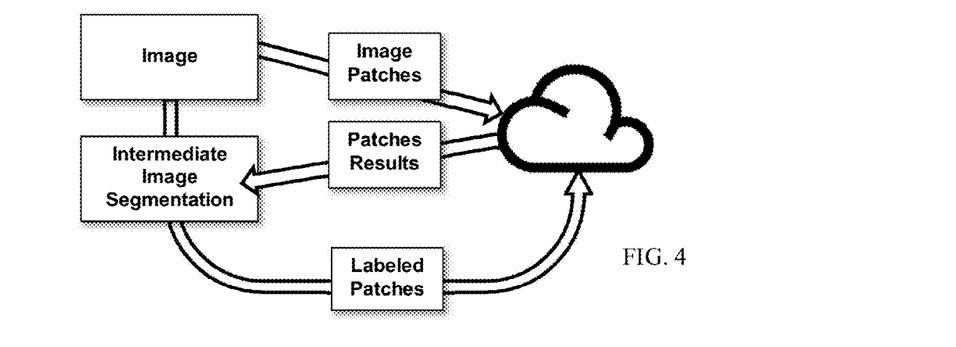
FIG. 4 illustrates one embodiment of an approach for cloud-based classification.

The method of FIG. 2 is performed by one computer or imaging system. In other embodiments, the patch classification of act 20 is performed by a server with the local computer acting as a client. FIG. 4 illustrates one embodiment of the client-server approach. The server provides cloud-based support for the classification of the patches in a service-based business model. This cloud framework or cloud-based solution provides the ML and application of the machine-learnt classifier in a remote server. Gross segmentation tasks of the image and reassembling patch classification results (e.g., Intermediate Image Segmentation) are handled locally. The patches of the image within the region of interest are sent over a computer network to a cloud computing platform. Patches are independent and therefore allow for massive parallelization at the cloud computing platform or server. The server returns the classification to the local computer for merging. In an optional act, after segmentation, users may select incorrectly labeled or missed regions that are then sent to the cloud platform for retraining and available for the next image to be processed.

This cloud-classification framework provides a business model for classification of patches. A single cloud-based platform may be improved and maintained for the benefit of several services and applications. A provider service trains, retrains, and/or uses a machine-learnt classifier to serve labels to customers operating local machines. For example, a hospital or radiologist group contracts for classification of patches. Using a local imaging system, the patches are extracted and sent to the service. The service returns classifications used locally for segmenting or other applications.

The users pay for the service. The possible labels and corresponding probabilities are provided for a charge. The cloud-based solution may allow for use of a mobile device, such as tablet, cellular smart phone, or laptop computer, as the local system. A camera may be used to send patches of images and receive labeled classification from the cloud server, such as for classifying a type of skin lesion.

Serving many customers may lead to a larger number of available patches and ground truths. Using this larger training data availability, a more accurate machine-learnt classifier may be trained. To assist in improvement or refinement of the classifier, discounts may be offered for submission of corrections or physician verified patch labels and corresponding patches to use in retraining. The verified ground truth may be associated with patches from different scanner models, dosages, and/or image settings. In retraining, features that are robust across the variation of imaging systems may be found for classifying. Alternatively, machine-learnt classifiers specific to models and/or image settings are trained using the large number of verified patches fed back to the cloud platform. The patches may also be used as a comparison of different scanner models and parameters. The feedback may be used to train classifiers for different regions or parts of the patient.

Figure 5:
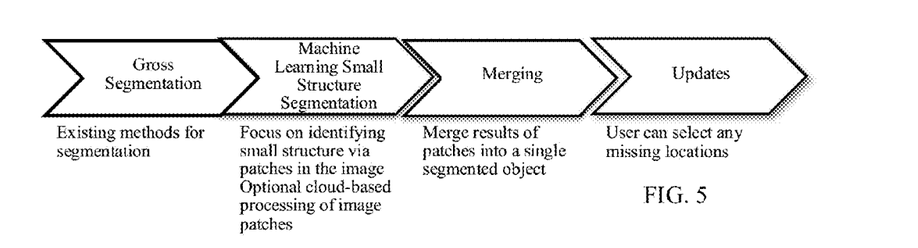
FIG. 5 illustrates an example use of voxel-level ML with classifier updates.
Figure 6:
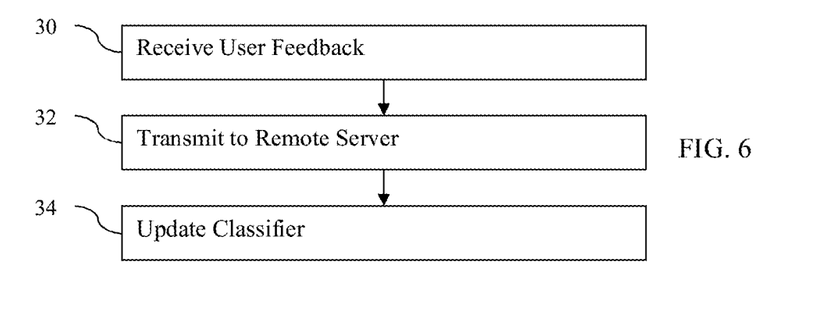
FIG. 6 is a flow chart diagram of one embodiment of a method for updating a voxel-level machine-learnt classifier in medical imaging.

The use of feedback to update in the cloud framework is described more with respect to FIGS. 5 and 6. FIG. 5 shows one embodiment of the general acts for updating. As discussed above for FIG. 2, the gross segmentation of the structure of interest is performed using any approach. This gross structure segmentation may include acts such as modeling the object to better identify structure. For example with airway tree segmentation, the hierarchical tree structure is found. In the next act, a machine-learnt classifier is used for a region restricted by the gross segmentation. Relatively small patches of the image are classified as discussed above for FIG. 2. The resulting classified patches are then merged to form the final segmentation as also discussed above for FIG. 2. Updates may then be made to create additional labeled data for later improvements to the classifier. As mentioned for FIG. 4, the verified or labeled patches are returned to the cloud server for updating the classifier. The patches may be stored, so the verification or corrected classification label only may be returned.

FIG. 6 shows one embodiment of a method for updating the classifier. The updating is provided in the cloud framework of FIG. 4. Alternatively, the updating is performed locally for a classifier used locally.

Additional, different, or fewer acts may be provided. For example, automated feedback is provided rather than manual feedback in act 30. As another example, all or some of the acts of FIG. 2 are also performed. FIG. 6 is from the perspectives of the local computer and the server. Other acts performed by either component may be provided.

In act 30, a user inputs an indication of error in the classifying for at least one of the patches. The local computer or the server receives the user input. The user views a display of the patch or an image including more than the patch. For example, an output rendering of the segmented anatomical structure is viewed. If the user notices one or more locations (e.g., a region) incorrectly classified, the user selects the locations and indicates the correct classification. For example, the user extracts or removes the locations as not being of the anatomical structure or the user adds locations not classified as being of the anatomical structure to the anatomical structure. The user uses the user input to mark missed locations or remove incorrectly added locations. The processor may assist, such as by providing user interface tools for correction and/or extrapolating the correct classification by the user's addition or removal of locations to the anatomical structure.

In act 32, the correction is transmitted to the remote server. The correction is transmitted by the local computer or imaging system to the remote server. The correction indicates a different classification than provided by the remote server. Alternatively or additionally, an indication of correct classification may be transmitted.

The patch associated with the correction may be transmitted with or separately from the correction. For example, the patch transmitted for classification by the remote server is stored. Upon receiving the correction, the patch may be matched with the correction for use in updating the machine-learnt classifier. As another example, the patch is sent again with the correction.

For updating the machine-trained classifier, updates indicating mislabeled regions are passed by the user to the cloud platform. The updates allow for the re-training or appending of the database to train the classification through a cloud-based solution. In alternative embodiments, the transmission to the remote server of act 32 is not performed and the update instead occurs at the local computer.

In terms of security, an encrypted transmission is used to prevent unwanted recipients from acquiring the image patches. Since only patches are sent with no other patient-identifying data, intercepted patches may not compromise the patient's identify and a small image patch may be of little value. Thus, the transmission poses little security risk as compared to transmitting the entire dataset.

In act 34, the machine-learnt classifier is updated. One or more patches and corresponding corrected classifications are used to update the classifier. The feedback is used to retrain the classifier so that the same error is less likely to be made in the future. The retrained classifier may then be applied to patches for other patients.

The processor, such as a server, performs the retraining. The processor is configured by hardware and/or software to update the machine trained classifier in response to feedback about the classifying. As new patches become available, the entire training process may be repeated. The previous ground truth and patches with the addition of the correction and associated patches are used to train the classifier again using ML. In an alternative embodiment, the processor performs stochastic learning to dynamically update the system. As each correction and patch or as groups of corrections and patches are provided, the existing classifier is altered to update on a periodic, regular, or occasional basis. Once passed to the cloud platform, the updates may either be used to dynamically update the cloud-based platform or be cached for manual review before committing the update to the learning algorithm.

Minor corrections may be isolated into patches as well and used to improve or retrain the system. The minor corrections may be for locations within a patch being considered as the anatomy of interest or not.

Figure 7:
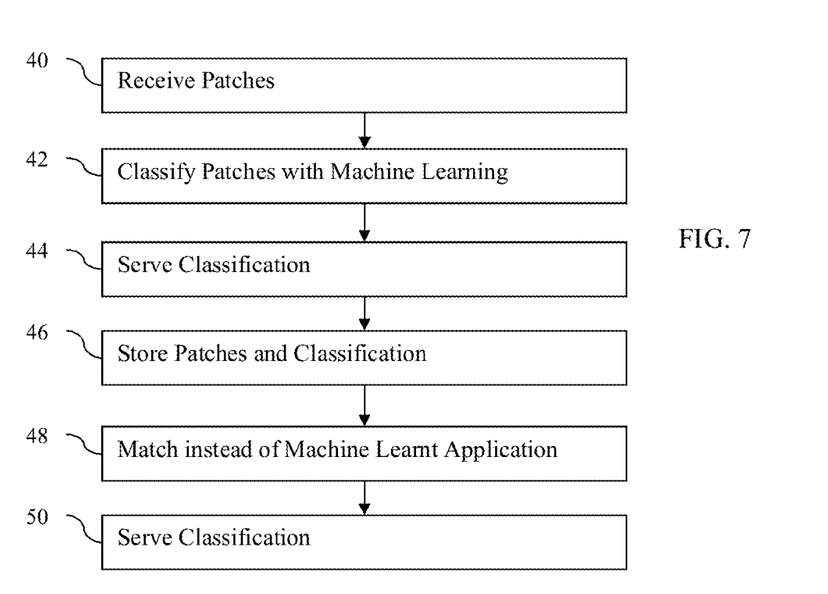
FIG. 7 is a flow chart diagram of one embodiment of a method for replacement of a voxel-level machine-learnt classifier in medical imaging.

FIG. 7 shows another method for using voxel-level machine-learnt classification in medical imaging. The cloud framework of FIG. 4 may allow for building a patch library. Patches with verified classifications are collected. Since the patches are relatively small and the cloud platform interacts with many computers for classification and feedback, acquiring labeled patch data may take less time than if done for one local computer. The collection occurs as part of the standard serving of classification and updating. The collection may be automated as part of user interface segmentation correction steps performed by the local systems.

By storing a large database of labeled patch data, multiple ML methods may be leveraged and evaluated. As additional training data is collected, different ML approaches may be tested to identify a more or most appropriate ML approach for a given training dataset of patches and/or anatomy.

Since the patches are relatively small, the number of possible patches is limited. Given a sufficient variation in the collected patches, the ML may be replaced with patch matching and outputting the known or already verified classification based on the match. The closest patch and/or corresponding label are output as the classification. The classifying with the machine-learnt classifier is replaced with matching of patches with patches from the collection. Alternatively, the match results are used in a further conglomeration of results with machine-trained classification.

Additional, different, or fewer acts may be provided. For example, acts associated with gross segmentation and locating anatomical structures are provided. As another example, acts for outputting segmented results or classification information are provided. The acts are performed in the order shown or a different order.

In act 40, patches of scan data of different patients are received from different computers over time. The patches are from tens, hundreds, or thousands of patients. Ones, tens, hundreds, or thousands of patches may be received for each patient. The patches are received over any time period, such as hours, days, weeks, months, or years.

In one embodiment, the patches are received as part of segmentation or other classification in the cloud-based framework of FIG. 4. The patches are received for classification, such as described above for FIG. 2.

In act 42, a machine-learnt classifier classifies the patches of the scan data of the patients. The processor applies the classifier to the patches. As a result of application, the patch, parts of the patch, or a location in the patch is classified as representing an object or not representing an object. Multiple object classification may be used, such as classifying as airway, vessel, or other. The classification described above for act 20 in FIG. 2 is performed.

In act 44, the server serves classifications for the patches to the local computers. In response to a request from a local computer, the processor of the server replies back with a classification of the patch or patches provided by the local computer. Such replies are provided for each of the requesting local computers or clients.

In act 46, the patches are stored. The classification and patches are stored in one embodiment. Where corrections are not received, the classification may be treated as verified. Alternatively, the patches for only directly verified or user indicated verification are stored. Manually labeled patches, such as submitted by the user as reclassified from mislabeled patches, submitted by the user with a classification, and/or submitted by the user and classified by another, are used for building the library.

The server stores the patches and the classification in a database, such as a local or remote memory. A potentially massive database may be dynamically built. Using feedback for updating or other verification, the patches with different combinations of data for a given anatomy and/or classification are stored. For example, patches with different combinations of intensities, x-ray attenuations, or densities at different locations are stored. The patches are for classifying airways in lungs, so some correspond to airways and some do not. In the cloud-framework, the cloud server continues to develop a large inventory or dictionary of patches through classification serving, such as described for FIG. 4. The library may be used for classification and/or for comparison, serving both algorithms and end-users.

Different libraries of patches with verified classification may be created and stored. For example, one library for airways and another library for vessels are created. As another example, one library for vessels and another library for CFD are created. In yet another example, different libraries are provided for different conditions, organs, and/or patient cohorts (e.g., women verses men).

Eventually, the number of patches represents a sufficient sampling of possible or likely patches that matching becomes more accurate than classifying with a machine-learnt classifier. The variation across the patches in the database becomes statistically significant based on the number of different patches. Statistically significant variation is measured for accuracy of classification, distribution across likely or possible options, amount of difference between patch not more similar to another patch, or other measure. Any measure indicating that the database has sufficient likely or common patches to accurately provide classification using matching is used. As numerous patches are added, all possible or a statistically significant number of patches are stored in the cloud. Given small patch sizes, reaching this number of stored patches may occur. Alternatively, an operator decides there is enough or a certain percentage of the possible patches are in the database. Time of collection (e.g. collect over 2 years) may be used instead of numbers.

In act 48, the classifying with the machine-learnt classifier ceases. Instead, matching with a patch of the database is used. A minimum sum of absolute differences, correlation, or other measure of similarity is performed to find the most similar patch from the database. The classification of the most similar patch is returned. This matching to find class may operate more efficiently than application of the machine-learnt classifier.

A nearest-neighbor lookup is used to return the classification results. The cloud-based dictionary is created using ML as an intermediate step before the dictionary is fully populated. With a dense dictionary, the nearest patch may also be returned as a reference. In cases where the region is comprised of a small amount of patches, the returned nearest patches may be used to visually verify that the images used as a basis for the returned labels correctly match.

In act 50, the server serves the classifications for patches. Using the matching, the classification for any given patch is found and returned to the client computers. The classification with or without the matching patch and/or the patch from the client computer is transmitted over a computer network to the client computer, such as an imaging system or workstation.

Figure 8:
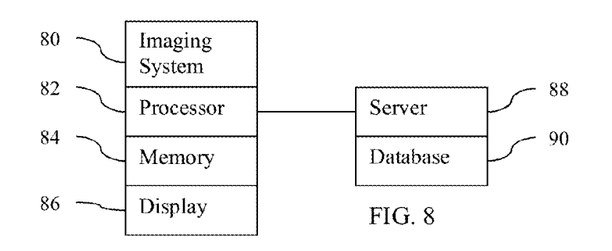
FIG. 8 is one embodiment of a system for use of a voxel-level machine-learnt classifier in medical imaging.

FIG. 8 shows a system for use of ML in medical imaging. The system includes an imaging system 80, a memory 84, a processor 82, a display 86, a server 88, and a database 90. Additional, different, or fewer components may be provided. For example, a network or network connection is provided, such as for networking with a medical imaging network or data archival system. In another example, a user interface is provided. As another example, the server 88 and database 90 are not provided. In other examples, the server 88 connects through a network with many imaging systems 80 and/or processors 82.

The processor 82, memory 84, and display 86 are part of the medical imaging system 80. Alternatively, the processor 82, memory 84, and display 86 are part of an archival and/or image processing system, such as associated with a medical records database workstation or server, separate from the imaging system 80. In other embodiments, the processor 82, memory 84, and display 86 are a personal computer, such as desktop or laptop, a workstation, a server, a network, or combinations thereof. The processor 82, display 86, and memory 84 may be provided without other components for acquiring data by scanning a patient.

The imaging system 80 is a medical diagnostic imaging system. Ultrasound, computed tomography (CT), x-ray, fluoroscopy, positron emission tomography, single photon emission computed tomography, and/or magnetic resonance (MR) systems may be used. The imaging system 80 may include a transmitter and includes a detector for scanning or receiving data representative of the interior of the patient.

In one embodiment, the imaging system 80 is a CT system. An x-ray source is connected with a gantry. A detector is also connected with a gantry opposite the x-ray source. The patient is positioned between the source and detector. The source and detector are on opposite sides of the patient and rotate and/or translate about the patient. The detected x-ray energy passing through the patient is converted, reconstructed or transformed into data representing different spatial locations within the patient.

In another embodiment, the imaging system 80 is a MR system. The MR system includes a main field magnet, such as a cryomagnet, and gradient coils. A whole body coil is provided for transmitting and/or receiving. Local coils may be used, such as for receiving electromagnetic energy emitted by atoms in response to pulses. Other processing components may be provided, such as for planning and generating transmit pulses for the coils based on the sequence and for receiving and processing the received k-space data. The received k-space data is converted into object or image space data with Fourier processing.

The memory 84 may be a graphics processing memory, a video random access memory, a random access memory, system memory, cache memory, hard drive, optical media, magnetic media, flash drive, buffer, database, combinations thereof, or other now known or later developed memory device for storing data or video information. The memory 84 is part of the imaging system 80, part of a computer associated with the processor 82, part of a database, part of another system, a picture archival memory, or a standalone device.

The memory 84 stores medical imaging data representing the patient, segmentation information, locations of anatomy and/or anatomical structure, patches, classification results, a machine-learnt matrix, and/or images. The memory 84 may alternatively or additionally store data during processing, such as storing seed locations, detected boundaries, gradient information, graphic overlays, quantities, or other information discussed herein.

The memory 84 or other memory is alternatively or additionally a non-transitory computer readable storage medium storing data representing instructions executable by the programmed processor 82 for use of ML in medical imaging. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 82 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for segmentation or other use of ML classification. The processor 82 is a single device or multiple devices operating in serial, parallel, or separately. The processor 82 may be a main processor of a computer, such as a laptop or desktop computer, or may be a processor for handling some tasks in a larger system, such as in an imaging system. The processor 82 is configured by instructions, design, hardware, and/or software to perform the acts discussed herein.

The processor 82 is configured to perform the acts discussed above. In one embodiment, the processor 82 is configured to segment, locate structure, divide data associated with the located structure into patches, classify the patches using ML, merge the classified structure for patches with the located structure, and generate an output image. In other embodiments, the processor 82 is configured to transmit the patches to a server and receive classification results from the server rather than to perform machine-learnt classification. The processor 82 may be configured to generate a user interface for receiving corrections or verification of classification results and provide the correction or verification to the server 88.

The display 86 is a monitor, LCD, projector, plasma display, CRT, printer, or other now known or later developed devise for outputting visual information. The display 86 receives images, graphics, text, quantities, or other information from the processor 82, memory 84, or imaging system 80. One or more medical images are displayed. The images are of a region of the patient. In one embodiment, the images are of an airway tree structure with or without other lung tissue, such as three-dimensional rendering of the lungs with the airway tree structure highlighted by opacity or color. The locations of the airway tree structure located by the processor 82 are used to enhance the rendering. The image includes an indication, such as a graphic or colorization, of the located anatomical structure. Alternatively or additionally, the image includes a quantity based on the classification, such as a CFD value. The quantity may be displayed as the image without the medical image representation of the patient.

The server 88 is a processor or group of processors. More than one server 88 may be provided. The server 88 is configured by hardware and/or software to receive patches, classify the patches, and return the classification. The server 88 may be further configured to create a database of patches, perform matching between patches, and/or update a machine-learnt classifier. To classify, the server 88 either applies a machine-learnt classifier to the patches or matches to patches with known classification. The server 88 may build a database of classified patches and cease using machine-learnt classification once the database holds a large number of patches.

The database 90 is a memory, such as a bank of memories, for storing patches and respective classifications. The database 90 stores the database of patches created by the server 88.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for use of machine-learnt classifier in medical imaging, the method comprising:

segmenting, by a processor, gross parts of an anatomic structure of a patient represented in medical imaging data;

locating, by the processor, a region adjacent and separate from the segmented gross parts of the anatomic structure, and locating the gross parts of the anatomic structure from the segmenting, where the region contains relatively smaller parts of the anatomic structure and contains tissue not of the anatomic structure, where the relatively smaller parts of the anatomical structure are smaller than the gross parts of the anatomical structure;

dividing, by the processor, the region represented in the medical imaging data into a plurality of patches;

classifying, with a machine-learnt classifier, each of the patches as including relatively smaller parts of the anatomical structure or not including relatively smaller parts of the anatomical structure, the classifying of each of the patches being independent of classifying the other patches;

merging, by the processor, locations for the patches classified as including relatively smaller parts of the anatomical structure to the gross parts of the anatomical structure; and outputting, on a display, a segmented image of the anatomical structure including locations from the locating and the merged locations from the patches.

2. The method of claim 1 wherein locating comprises region growing.

3. The method of claim 1 wherein segmenting the anatomical structure comprises region growing and skeletonization.

4. The method of claim 1 wherein the anatomic structure is a lung, the gross and relatively smaller parts of the anatomic structure are airways, and wherein outputting comprises outputting an image of the gross and smaller airways.

5. The method of claim 1 wherein dividing comprises dividing into overlapping patches.

6. The method of claim 1 wherein classifying comprises classifying with the machine-learnt classifier comprising a neural network.

7. The method of claim 6 wherein classifying comprises classifying with the machine-learnt classifier comprising a deep learnt, sparse auto-encoder classifier.

8. The method of claim 1 wherein classifying comprises classifying into as including relatively smaller parts of the anatomical structure or not and at least one other anatomical structure or not.

9. The method of claim 1 wherein the patches comprise no more than 50 pixels or voxels along a longest dimension.

10. The method of claim 1 wherein merging comprises removing the locations for patches classified as including relatively smaller parts of the anatomical structure but not connected to other of the locations directly or through a line or curve fit.

11. The method of claim 1 wherein segmenting, locating, and dividing are performed by the processor at a local system and wherein classifying is performed with the machine-learnt classifier by a server remote from the local system.

12. The method of claim 1 further comprising:

receiving from a user input an indication of error in the classifying for at least one of the patches;

transmitting the at least one of the patches and a corrected classification to a remote server; and updating the machine-learnt classifier using the at least one of the patches and the corrected classification.

13. The method of claim 12 further comprising:
collecting the patches and additional patches with verified classifications; and
replacing the classifying with the machine-learnt classifier with matching from the collection of the patches and the additional patches.

14. The method of claim 1 wherein merging comprises skeletonization or creation of a surface mesh of the merged gross and relatively smaller parts of the anatomic structure.

15. A method for use of voxel-level machine-learnt classifier in medical imaging, the method comprising:
locating, without using a machine trained operator, gross parts of a structure from data representing a patient and a region around and outside the gross parts of the structure;
dividing, by a processor, the data representing the patient in the region around and outside the gross parts of the structure into sub-sets;
classifying, by the processor using a machine trained classifier, the sub-sets of the data representing the patient within the region around the structure as representing a relatively smaller part of the structure in the region or not, where the relatively smaller part of the anatomical structure is smaller than the gross parts of the anatomical structure; and
expanding the structure with locations corresponding to the sub-sets classified as belonging to the structure by adding the relatively smaller part of the structure to the gross part of the structure.

16. The method of claim 15 wherein locating comprises locating with region growing and skeletonization, and wherein classifying comprises classifying with a neural network.

17. The method of claim 15 wherein locating and expanding are performed by another processor and wherein the processor for classifying is remote to the other processor and acts as a server of the other processor.

18. The method of claim 17 wherein the processor is configured to update the machine trained classifier in response to feedback about the classifying from the other processor.

19. The method of claim 15 wherein the structure is a lung, the gross and relatively smaller parts of the structure are parts of an airway tree of the lung.

* * * * *